United States Patent [19]

Heberle et al.

[11] Patent Number: 4,757,186

[45] Date of Patent: Jul. 12, 1988

[54] METHOD WHICH ALLOWS CONTINUED USE OF A CREDIT CARD WHICH IS EXPIRED IN TIME OR VALUE UNITS

[75] Inventors: Wolfgang Heberle, Wolfratshausen; Max Ludwig, Munich, both of Fed. Rep. of Germany

[73] Assignee: Siemens Aktiengesellschaft, Berlin & Munich, Fed. Rep. of Germany

[21] Appl. No.: 918,026

[22] Filed: Oct. 14, 1986

[30] Foreign Application Priority Data

Nov. 19, 1985 [DE] Fed. Rep. of Germany ....... 3541050

[51] Int. Cl.⁴ .............................................. G06K 5/00
[52] U.S. Cl. .................................. 235/380; 235/379; 235/382; 235/382.5
[58] Field of Search ............. 235/379, 380, 382, 382.5

[56] References Cited

U.S. PATENT DOCUMENTS 3,718,764 2/1973 Deschenes .................... 235/380 X

Primary Examiner—Harold I. Pitts
Attorney, Agent, or Firm—Hill, Van Santen, Steadman & Simpson

[57] ABSTRACT

A method which allows the continued use of a credit card which is expired in terms of time or value units for automatic vendors which are in communication with a central evaluation location. The method of the invention allows a continuation of telephone calls, for example, even with an expired telephone credit card. This occurs in that debiting of the fee units used or made to the account of the card owner at the central evaluation location in a chronologically limited transition time after every service performance so that a call is not cut-off in the middle of a call.

1 Claim, 1 Drawing Sheet

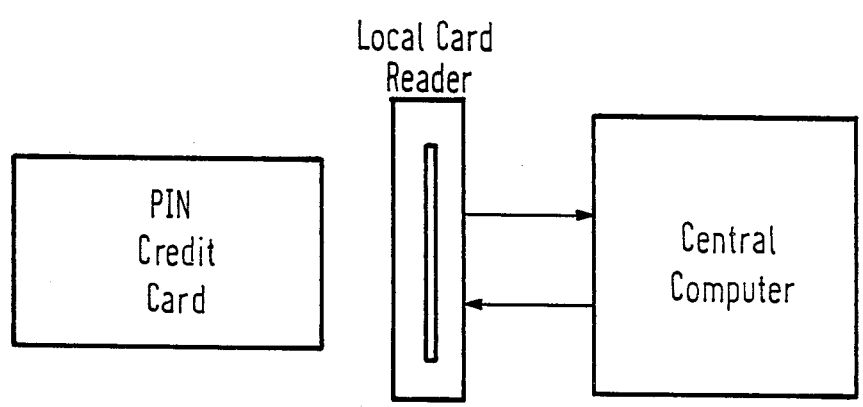

METHOD WHICH ALLOWS CONTINUED USE OF A CREDIT CARD WHICH IS EXPIRED IN TIME OR VALUE UNITS

BACKGROUND OF THE INVENTION

1. Field of the Invention

This invention relates in general to a method for continued use of a credit card which has expired in terms of time and/or value units which is used for automatic vendors which are in communication with the central evaluation location and, particularly, for telecommunication equipment operable with credit cards and connected to a telephone exchange.

2. Description of the Prior Art

When using credit cards for purpose of cash free telephoning, it can occur that the units stored on the credit card are used in terms of time or value. The consequence of the use of the credit causes a telephone call to be suddenly interrupted since no further credit remains on the card. In order to maintain the call or to initiate a new call, the telephone user can only employ a new credit card which, however, is not always available.

SUMMARY OF THE INVENTION

It is an object of the present invention to provide a method which allows the continuations of calls even when an expired credit card is used.

The object is achieved in that debiting of the fee used to the account of the card owner is undertaken at the central evaluation location in a chronologically limited transition time after every service performance.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWING

The FIG. illustrates a credit card which can be used after it has expired.

DESCRIPTION OF THE PREFERRED EMBODIMENTS

The FIG. illustrates a credit card which can be inserted into a local card reader at, for example, at a local telephone station so as to initiate a telephone call. The local card reader is capable of reading the expiration time of the card and the number of value units remaining on the card as well as the personal identification number of the user. In the present invention, if the card has expired in time or if the paid for credit units have been used up, such information is furnished to a central computer which then allows the credit card to be used even though it has expired or the value units have been used up and the central computer accumulates the charges for the telephone call and then bills the card user. Thus, in the present invention, continued telephoning is thus possible in a chronologically limited scope. Since the debiting, however, occurs after every service performance increased debit costs occur for the user. These increased debit costs, however, represent a certain stimulus for the user to acquire a new credit card as soon as possible.

Although the invention has been described with respect to preferred embodiments, it is not to be so limited as changes and modifications can be made which are within the full intended scope of the invention as defined by the appended claims.

We claim as our invention:

1. A method for continued employment of a credit card which has expired in terms of time and/or value units for automatic vendors which are in communication with a central evaluation location, particularly for telecommunications equipment operable with credit cards and in communication with an exchange, comprising identifying in the central evaluation location that the card has expired, and debitting of the fee units used to the account of the card owner at the central evaluation location in a chronologically limited transition time after every service performance.

* * * * *